United States Patent [19]

Hayakawa et al.

[11] Patent Number: 4,625,117

[45] Date of Patent: Nov. 25, 1986

[54] MULTI-CELL RADIATION DETECTOR

[75] Inventors: Takayuki Hayakawa, Hachioji; Manabu Nakagawa, Tsukui; Hideji Fujii, Nishitama; Shigeru Sato, Kitasouma, all of Japan

[73] Assignees: Hitachi, Ltd.; Hitachi Medical Corporation, both of Tokyo, Japan

[21] Appl. No.: 635,738

[22] Filed: Jul. 30, 1984

[30] Foreign Application Priority Data

Jul. 30, 1983 [JP] Japan ............................... 58-140109

[51] Int. Cl.[4] .............................................. G01T 1/185

[52] U.S. Cl. ..................................... 250/385; 250/374

[58] Field of Search .................. 250/385, 374; 378/19; 313/93

[56] References Cited

U.S. PATENT DOCUMENTS

| | | | |
|---|---|---|---|
| 4,031,396 | 6/1977 | Whetten et al. | 250/385 |
| 4,075,527 | 2/1978 | Cummings | 313/93 |
| 4,297,576 | 10/1981 | Laval et al. | 378/19 |
| 4,345,155 | 8/1982 | Allemand et al. | 250/385 |
| 4,491,734 | 1/1985 | Yamaguchi et al. | 250/385 |
| 4,496,842 | 1/1985 | Hermens et al. | 250/385 |
| 4,535,245 | 8/1985 | Zonneveld et al. | 250/385 |

*Primary Examiner*—Carolyn E. Fields
*Attorney, Agent, or Firm*—Antonelli, Terry & Wands

[57] ABSTRACT

A multi-cell radiation detector constructed such that a first group of electrodes to which is applied high voltage and a second group of electrodes to which are connected signal leads are alternately arranged inside a vessel containing ionizable gas enclosed therein. The first group electrodes are provided with terminals to which are connected leads for introducing high voltage from the exterior, while the second group electrodes are provided with terminals to which are connected leads for leading out signal outputs to the exterior. These leads and terminals are all disposed at positions offset from traveling path of the radiation so as to reduce the volume of the space under the weak electric field behind the electrode section.

6 Claims, 4 Drawing Figures

MULTI-CELL RADIATION DETECTOR

BACKGROUND OF THE INVENTION

The present invention relates to a radiation detector for use in an X-ray computerized tomography system hereinbelow, referred to as "X-ray CT"), and more particularly to a radiation detector which permits reduction in variations of signal output characteristics from individual cells in a multi-cell ionization chamber radiation detector.

The type of X-ray CT most popularly used at present is what is called a rotate-rotate type. According to the X-ray CT of this type, a tomogram is taken as follows. An X-ray source radiating a fan beam X-ray with an opening degree of nearly 40 degrees is disposed opposite to a multi-cell X-ray detector (hereinbelow, abbreviated simply as "detector") with the distance of about 1 m therebetween. The X-ray source and the detector are revolved about an object placed therebetween while keeping the positional relationship relative to each other. X-rays are irradiated to the object in many directions to measure X-ray intensity distribution, and the measured signals are then processed using a computer to obtain a tomogram.

The defect of this type apparatus is in that a ring-like artifact is apt to occur in the tomogram. The ring-like artifact will be caused in case cells of the detector have their sensitivities different from one another to a certain or more degree. From this reason, it is required to reduce variations in sensitivities among the cells of the detector.

In the X-ray CT using such a tomographic technique, a xenon ionization chamber detector is mainly employed as a detector, one example of which is disclosed in the U.S. Pat. No. 4,161,655.

Pulsed irradiation and continuous irradiation are usually employed in X-ray CT as a method of irradiating X-rays, and pulsed irradiation is employed in the rotate-rotate type apparatus as mentioned above. In the pulsed irradiation, there are repeated, for example, X-ray irradiation of 5 msec and pause of 10 msec.

As a result of measuring output currents from a xenon ionization chamber detector in case of using the pulsed irradiation, it was found that the output current did not become zero after stopping of X-ray irradiation and there occurred a residual current. It was also determined that the residual current had different amounts for each cell depending on the structure of the detector and this caused the aforesaid ring-like artifact.

More specifically, the output currents from individual cells of the detector are integrated by an integrator and then transmitted to an image processing apparatus in the form of signal voltage. It is very difficult to closely coincide the integrating period of the integrator with the period of X-ray irradiation, so that the difference in residual currents will appear as a difference in sensitivities of the cells.

SUMMARY OF THE INVENTION

It is a primary object of the present invention to provide a multi-cell radiation detector which can reduce amounts of residual currents in a detector and which is suitable for use in X-ray CT using a pulsed irradiation method.

Another object of the present invention is to provide multi-cell radiation detector which can restrain occurrence of variations in sensitivities among individual cells.

The detector according to the present invention is featured in that terminals to which are connected lends for applying high voltage and for taking out signals are alternately provided at rear parts of electrode plates for partitioning individual cells of the detector, and these terminals are disposed to be spaced from each other at positions offset from the traveling path of the radiation introduced through a radiation transmissive window of the detector. With this arrangement, the electric field produced in a space behind the electrode plates have the relatively uniform strength on at least the ingress path of the radiation, so that sensitivity among cells are restrained.

Further, according to another feature of the present invention, the volume of a space defined between the wall surface of a vessel behind the electrode plates and the rear ends of the electrode plates is so selected that the number of charged particles generated in this space becomes 1/100 of the number of charged particles generated in ionization areas between the electrode plates. With this arrangement, the number of charged particles generated in the weak electric field region behind the electrode plates becomes less, thereby reducing an amount of residual currents after X-ray pulsed irradiation.

Other features of the present invention will be apparent from the following description in conjunction with a preferred embodiment.

DETAILED DESCRIPTION OF THE INVENTION

Figure 1:
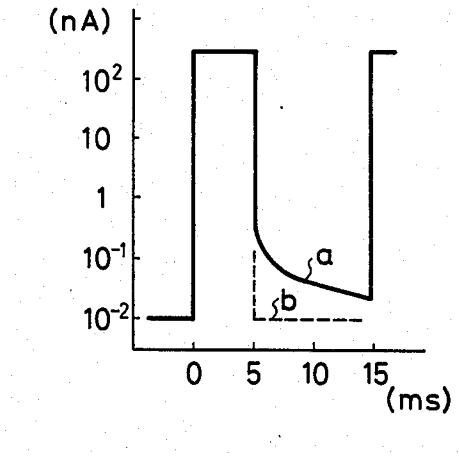
FIGS. 1 and 2 are time charts showing the residual current in an X-ray detector and an influence thereof upon an output signal, respectively, which are considered in the present invention to be overcome.
Figure 2:
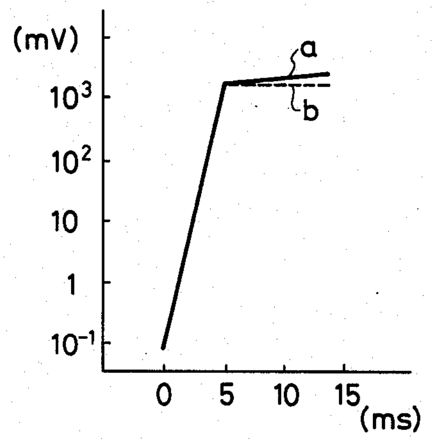

Prior to description of a preferred embodiment of the present invention, there will be provided a discussion of the residual current of a detector and an influence thereof which are considered in the present invention to be overcome, by referring to FIGS. 1 and 2. FIG. 1 shows output current characteristics of a conventional xenon ionization chamber X-ray detector in case of pulsed X-ray irradiation in which X-ray irradiation of 5 msec and pause period of 10 msec are repeated alternately. It will be found that there occurs the residual current indicated by a solid line a during the pause period between X-ray irradiations. In the figure, b represents an output current in the absence of the residual current. The output current from the detector is integrated by an integrator in a detection circuit and then transmitted to an image processing apparatus in the form of signal voltage. FIG. 2 shows changes in values of the signal voltage thus obtained after integration, in which a solid line a represents the case including the residual current and a broken line b represents the case of no residual current. As will be seen from the figure, when individual cells of the detector produce residual currents different from one another, outputs from the integrators are varied among the respective cells, thus causing the aforesaid ring-like artifact.

In order to reduce the degree of an influence caused by the residual currents, there is proposed a method of which in integrating time period of each integrator is limited only to the X-ray irradiation time period of the above pulsed irradiation. However, this method gives rise to another problem of an increase in the number of circuit parts due to the need of closely coinciding the integrating time period with the irradiation time period.

Figure 3:
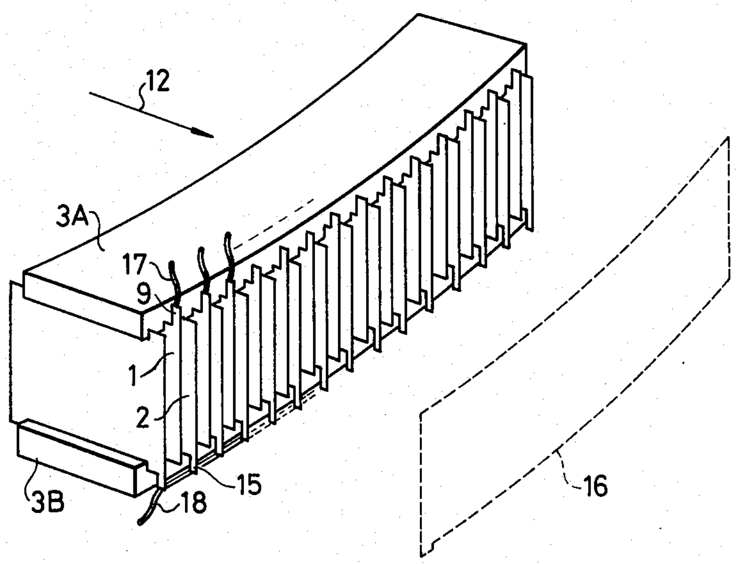
FIGS. 3 and 4 are a perspective view and a sectional view showing one embodiment of the present invention, respectively.

Hereinafter a preferred embodiment of the present invention will be described by referring to FIGS. 3 and 4. FIG. 3 shows the electrode section of a xenon ionization chamber X-ray detector according to the embodiment of the present invention.

A plurality of electrode plates 1, 2 each constructed of an X-ray non-transmissive material, such as molybdenum or tungsten, with a thickness of 0.05–0.15 mm are radially arranged, and they are fixedly inserted in respective grooves formed in a pair of two electrode holding grooved plates 3A, 3B each made of an insulator. The electrode plate 1 serves as a signal detecting electrode and is provided at the upper rear end thereof relative to the direction of incidence of X-ray as indicated by an arrow 12 with a terminal 9, to which is connected a lead wire 17 for detecting a signal. On the other hand, the electrode plate 2 serves as an electrode for applying high voltage and is provided at the lower rear end thereof with a terminal 15, to which is connected a lead wire 18 for applying high voltage. These electrode plates 1, 2 are alternately arranged such that the electrode plate 1 is disposed at the center of a space defined by all adjacent electrode plates 2 to form each detection cell. FIG. 4 is a sectional view showiong the state where the electrode section shown in FIG. 3 is fixed inside a vessel of the detector. More specifically, the vessel is composed of two members 4A, 4B airtightly connected to each other, and high pressure xenon gas or krypton gas is filled within the vessel. The foregoing electrode section is secured to the member 4A through a spacer 5 and arranged so that the X-ray incident from an X-ray transmissive window 20 formed at the front surface of the member 4B passes an ionization area between the electrode plates 1 and 2. The terminals 9 and 15 are disposed at positions offset upwardly and downwardly from the X-ray traveling path indicated by 12 in the figure, respectively. A signal detecting wire load 17 connected to the terminal 9 is led out of the detector through an airtight connector path 8. On the other hand, a high-voltage applying lead 18 connected to the terminal 15 is extended in the lower part of a space 10 defined between the electrode section and the rear wall surface of the vessel member 4A in the direction perpendicular to the plane of drawing paper. In this way, both leads are arranged so as not to cross the X-ray traveling path 12. With the electrode section thus arranged, the electric field round each signal electrode plate 2 in the electrode section becomes uniform and, therefore, the residual currents produced in respective cells of the detector also become uniform. This makes it possible to restrain variations in sensitivities of the individual cells caused by the residual currents and hence to prevent occurrence of the ring-like artifact.

Further, with the electrode section thus arranged, the space 10 behind the electrode section can be made much smaller than that formed in the prior art. The reduced volume of the space 10 behind the electrode section means that an amount of gas to be ionized in the region of the weak electric field is decreased. This has a substantial effect in point of reducing the residual current.

On the basis of the experimental result, the space 10 behind the electrode section is desirably determined to have a volume so that the number of charged particles generated in the space behind the electrode section is no greater than about 1/100 of the number of charged particles generated in the ionization areas between the electrode plates 1, 2. In the detector which has smaller volume behind the electrode section as mentioned above, since an absolute amount of the residual current is small, it becomes possible to neglect variations in cell's sensitivities due to misadjustment of integrating periods of the integrators for integrating signal currents from the individual cells, or due to change of X-ray photon energy.

In case the incident X-ray is a monochromatic X-ray of 60 Kev and xenon gas under 20 atm. is filled within the vessel of the X-ray detector, the above condition, i.e., the condition that the number of charged particles generated in the space behind the electrode section becomes 1/100 of the number of charged particles generated in the areas between the electrodes opposite to each other, is achieved by setting a gap g between the rear ends of the electrode plates 1, 2 and the rear wall surface of the vessel at 7% of a width l of the electrode plates 1, 2. Assuming that l is 30 mm, for example, the gap g is desirably equal to or less than 2 mm.

Figure 4:
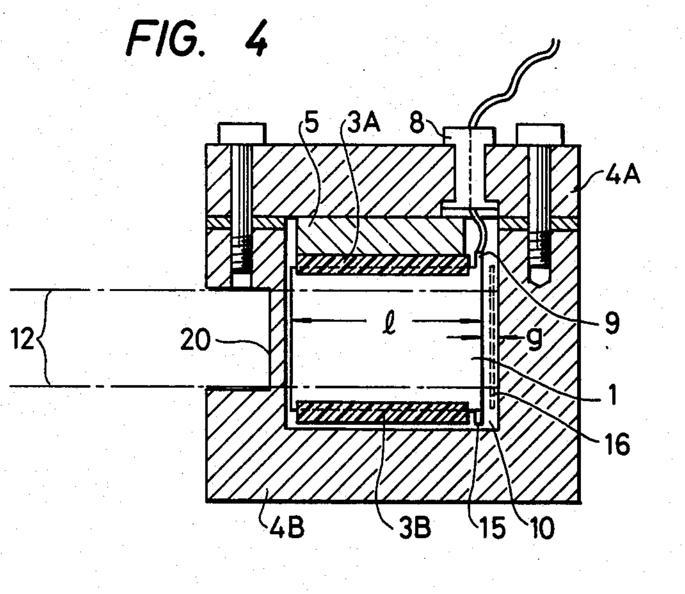

The same effect as obtained from the reduced space behind the electrode section can be also achieved by providing a shielding electrode plate 16 behind the electrode section, as indicated by broken lines in FIGS. 3 and 4. In other words, even if the space 10 behind the electrode section in the pressure vessel is somewhat large, there can be attained an effect of substantially narrowing the space by providing the shielding electrode plate 16, which has a potential equal to that of the high-voltage electrode plates 1, behind the electrode section within the space.

What is claimed is:

1. A multi-cell radiation detector comprising:

a vessel containing ionizable gas enclosed therein and provided at its front surface with a radiation transmissive window;

an electrode section fixedly inserted in respective grooves formed in a pair of insulated grooved electrode holding plates so as to be fixed inside said vessel in a traveling path of the radiation from said radiation transmissive window, and having a first group of electrode plates to which high voltage is applied and a second group of electrode plates from which signals are obtained, said electrode plates in both groups being arranged alternately to delimit a plurality of individual cells; and means for restraining variation in sensitivities caused by residual currents among the individual cells of the multi-cell radiation detector, said variation restraining means including first terminals associated with said first group of electrode plates and to which first lead means for introducing high voltage from the exterior of said vessel are connected, said first terminals being disposed proximate to rear edges of said first group of electrode plates, said rear edges being those edges disposed farthest away from said radiation transmissive window, and second terminals associated with said second group of electrode plates and to which second lead means for individually leading out signal outputs to the exterior of said vessel are connected, said second terminals being disposed proximate to rear edges of said second group of electrode plates, said rear edges being those edges disposed farthest away from said radiation transmissive window, said first and second terminals respectively projecting one of upwardly and downwardly from edges of said first and second group of electrode plates extending transversely to the rear edge of said first and second group of electrode plates at positions spaced from one another and offset from said travelling path of the radiation so that said travelling path of the radiation is located therebetween.

2. A multi-cell radiation detector according to claim 1, wherein the space between the rear end of said electrode section and the inner wall surface of said vessel on the rear side is set to have a volume so that the number of charged particles generated in said space is no greater than 1/100 of the number of charged particles generated in areas between said first and second group electrode plates.

3. A multi-cell radiation detector according to claim 2, wherein xenon gas under 20 atm. is enclosed within said vessel, and a gap width between the rear end of said electrode section and the inner wall surface of said vessel on the rear side is set at 7% or less of the width of said electrode section.

4. A multi-cell radiation detector according to claim 1, wherein a shielding electrode plate applied with the same potential as that of said first group electrode plates is arranged in the space between the rear end of said electrode section and the inner wall surface of said vessel on the rear side.

5. A multi-cell radiation detector according to claim 1, wherein said first lead means and said second lead means are connected to said first and second terminals, respectively, so as to be disposed at positions spaced from one another and offset from said traveling path of the radiation with said traveling path located therebetween.

6. A multi-cell radiation detector according to claim 1, wherein said first terminals are aligned with each other and said second terminals are aligned with each other, said first terminals being disposed so as to project from one of upper and lower edges of said first group of electrode plates and said second terminals being disposed so as to project from the other of the upper and lower edges of said second group of electrode plates.

* * * * *